(12) United States Patent
Mehta

(10) Patent No.: US 12,139,600 B2
(45) Date of Patent: Nov. 12, 2024

(54) POLYMER BLENDS WITH FURAN BASED POLYESTERS

(71) Applicant: Auriga Polymers, Inc., Charlotte, NC (US)

(72) Inventor: Sanjay Mehta, Spartanburg, SC (US)

(73) Assignee: Auriga Polymers, Inc., Charlotte, NC (US)

( * ) Notice: Subject to any disclaimer, the term of this patent is extended or adjusted under 35 U.S.C. 154(b) by 369 days.

(21) Appl. No.: 15/757,147

(22) PCT Filed: Jun. 17, 2016

(86) PCT No.: PCT/US2016/038018
§ 371 (c)(1),
(2) Date: Mar. 2, 2018

(87) PCT Pub. No.: WO2017/039782
PCT Pub. Date: Mar. 9, 2017

(65) Prior Publication Data
US 2018/0244913 A1    Aug. 30, 2018

Related U.S. Application Data

(60) Provisional application No. 62/214,259, filed on Sep. 4, 2015.

(51) Int. Cl.
| | | |
|---|---|---|
| *C08L 67/02* | (2006.01) | |
| *B29C 49/00* | (2006.01) | |
| *B29K 67/00* | (2006.01) | |
| *B29L 31/00* | (2006.01) | |
| *B65D 1/02* | (2006.01) | |
| *B65D 1/40* | (2006.01) | |
| *C08G 63/16* | (2006.01) | |
| *C08G 63/181* | (2006.01) | |
| *C08G 63/688* | (2006.01) | |
| *C09D 167/02* | (2006.01) | |
| *B29C 49/06* | (2006.01) | |

(52) U.S. Cl.
CPC .......... *C08L 67/02* (2013.01); *B29C 49/0005* (2013.01); *B65D 1/0207* (2013.01); *B65D 1/40* (2013.01); *C08G 63/16* (2013.01); *C08G 63/181* (2013.01); *C08G 63/6886* (2013.01); *C09D 167/02* (2013.01); *B29C 49/06* (2013.01); *B29K 2067/003* (2013.01); *B29K 2995/0067* (2013.01); *B29L 2031/7158* (2013.01)

(58) Field of Classification Search
CPC ....... C08L 67/02; B65D 1/0207; C08G 63/16; C08G 63/18; C08G 63/183; B29C 49/06; B29K 2067/003; B29L 2031/7158
USPC .............................................. 428/34.1–36.92
See application file for complete search history.

(56) References Cited

U.S. PATENT DOCUMENTS

| | | | | |
|---|---|---|---|---|
| 4,499,262 A | * | 2/1985 | Fagerburg | C08G 63/82 528/286 |
| 5,053,482 A | * | 10/1991 | Tietz | D01F 6/84 525/425 |
| 6,368,710 B1 | * | 4/2002 | Hayes | C08G 63/668 428/357 |
| 6,737,481 B1 | * | 5/2004 | Kurian | C08L 67/025 524/483 |

(Continued)

FOREIGN PATENT DOCUMENTS

WO    WO-2016130748 A1 *  8/2016  ......... B29C 49/0005

OTHER PUBLICATIONS

Hu et al., Improving Transparency of Stretched PET/MXD6 blends by modifying PET with isophthalate, Science Direct, May 5, 2005, pp. 5202-5210, vol. 46, Issue 14, https://www.sciencedirect.com/science/article/pii/S0032386105004465.

(Continued)

*Primary Examiner* — Michael C Romanowski
(74) *Attorney, Agent, or Firm* — Seth L. Hudson; Maynard Nexsen PC

(57) ABSTRACT

The invention relates to blends of sulfo-modified copolyester and polyalkylene furanoate such as polyethylene-, polybutylene-, or polytrimethylene-furanoate, or a mixture thereof. The sulfo-modified copolyester comprises at least about 75 mole % of polyethylene terephthalate or polyethylene naphthalate or a mixture thereof; and
at least about 0.1 mole % to about 5 mole % of units of the Formula (I)

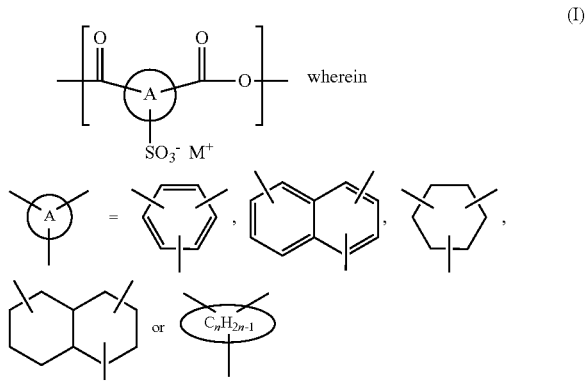

wherein n is an integer from 3 to 10 and
wherein M⁺ is an alkali metal ion, earth alkali metal ion, phosphonium ion or ammonium ion. Articles requiring high gas barrier are bottles for beer, juices, carbonated soft drinks, and the like.

7 Claims, No Drawings

(56) References Cited

U.S. PATENT DOCUMENTS

| | | | | |
|---|---|---|---|---|
| 6,787,245 B1* | 9/2004 | Hayes | | B32B 27/36 |
| | | | | 428/480 |
| 7,919,159 B2* | 4/2011 | Liu | | B65D 1/0207 |
| | | | | 525/425 |
| 2002/0177686 A1* | 11/2002 | Schmidt | | C08G 63/80 |
| | | | | 528/272 |
| 2003/0222047 A1* | 12/2003 | McRae | | B65D 1/0223 |
| | | | | 215/373 |
| 2005/0027098 A1* | 2/2005 | Hayes | | C09D 167/02 |
| | | | | 528/272 |
| 2008/0258355 A1* | 10/2008 | Mehta | | C08J 3/005 |
| | | | | 525/437 |
| 2009/0018264 A1* | 1/2009 | Fuseya | | C08K 3/346 |
| | | | | 524/604 |
| 2011/0071238 A1* | 3/2011 | Bastioli | | C08J 5/18 |
| | | | | 524/72 |
| 2011/0282020 A1* | 11/2011 | Sipos | | C08K 5/52 |
| | | | | 526/270 |
| 2012/0220680 A1* | 8/2012 | Bastioli | | C08L 67/02 |
| | | | | 524/21 |
| 2012/0258299 A1 | 10/2012 | Matsuda et al. | | |
| 2012/0322908 A1* | 12/2012 | Bastioli | | C08L 67/02 |
| | | | | 521/182 |
| 2013/0071588 A1* | 3/2013 | Bastioli | | C08G 69/00 |
| | | | | 428/458 |
| 2013/0095269 A1* | 4/2013 | Carman, Jr. | | C08G 63/199 |
| | | | | 521/182 |
| 2013/0270212 A1* | 10/2013 | Collias | | B65D 23/14 |
| | | | | 215/316 |
| 2014/0205786 A1* | 7/2014 | Nederberg | | C08G 63/16 |
| | | | | 428/411.1 |
| 2014/0336349 A1* | 11/2014 | Sipos | | B29C 49/06 |
| | | | | 528/306 |
| 2015/0110983 A1* | 4/2015 | Kriegel | | B29C 49/0005 |
| | | | | 428/36.6 |
| 2015/0141584 A1* | 5/2015 | Saywell | | C08G 63/85 |
| | | | | 528/279 |
| 2015/0307704 A1* | 10/2015 | Bhattacharjee | | B29B 7/88 |
| | | | | 264/210.1 |
| 2017/0058119 A1* | 3/2017 | Brun | | B32B 27/20 |
| 2017/0129994 A1* | 5/2017 | Sipos | | C08G 63/672 |
| 2017/0267390 A1* | 9/2017 | Chiang | | B29C 49/22 |
| 2018/0141260 A1* | 5/2018 | Duncan | | B65D 1/0207 |
| 2018/0223078 A1* | 8/2018 | Nakajima | | C08K 5/527 |

OTHER PUBLICATIONS

International Search Report for International Application No. PCT/US2016/038018 dated Sep. 13, 2016.

* cited by examiner

POLYMER BLENDS WITH FURAN BASED POLYESTERS

FIELD OF THE INVENTION

This invention relates to blends of polyalkylene furanoates and polyethylene terephthalate, and in particular to articles from such blends having high gas barrier. In particular the invention relates to blends of sulfo-modified copolyester and polyalkylene furanoate such as polyethylene-, polybutylene-, or polytrimethylene-furanoate, or a mixture thereof. The sulfo-modified copolyester comprises at least about 75 mole % of polyethylene terephthalate or polyethylene naphthalate or a mixture thereof; and at least about 0.1 mole % to about 5 mole % of units of the Formula (I)

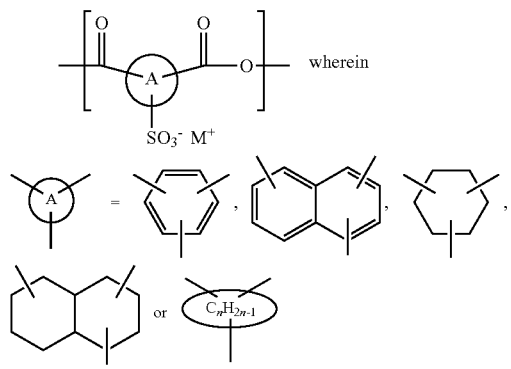

wherein n is an integer from 3 to 10 and
wherein $M^+$ is an alkali metal ion, earth alkali metal ion, phosphonium ion or ammonium ion. Articles requiring high gas barrier are bottles for beer, carbonated soft drinks, water, juices and the like.

BACKGROUND

Polyethylene terephthalate (PET) is the preferred polymer used in packaging applications. However in certain application such as carbonated soft drinks and containers for oxygen sensitive liquids and solids there is need for improved gas, carbon dioxide, and/or oxygen barriers. One approach to reduce the gas permeation in polyester packaging is to blend a polymer having much lower gas permeation, with the polyester. Examples of such high gas barrier (low gas permeation) polymers are poly(vinyl alcohol), poly(acrylonitrile), poly(ethylene naphthalate), partially aromatic polyamides such as MXD6 (made from the polymerization of m-xylene diamine and adipic acid), and polyglycolic acid.

Generally the blends of polyesters with high gas barrier polymers are immiscible resulting in a two-phase structure in which the high gas barrier polymer forms domains in the polyester matrix. During the processing of these blends into packaging articles such as films and containers, these domains are stretched into thin platelets parallel to the surface of the article. These platelets act as a barrier, by forming a tortuous path for the diffusion of gases through the article. The tortuous path for the gas results in low gas permeation.

The disadvantage of articles made from immiscible blends is that the size of the domains, together with the difference in refractive index between the polyester and the high gas barrier polymer, causes light to be scattered giving a hazy appearance to the packaging article. This problem has been met in the prior art by using compatiblizers to reduce the size of the domains. U.S. Pat. No. 6,346,307 discloses the use of pyromellitic anhydride as a compatibilizer for blends of polyethylene terephthalate (PET) with MXD6. U.S. Pat. No. 7,943,216 discloses the use of a sulfo-isophthalic acid salt as a comonomer with the PET as a compatibilizer for PET blends with MXD6. U.S. Pat. No. 8,609,783 discloses the use of a copolyester composition comprising terephthalic acid, isophthalic acid and 5-sulfo-isophthalic acid for blends with polyglycolic acid to make articles with high gas barrier and good transparency.

Recently there has been a thrust to develop the raw materials for PET, i.e. ethylene glycol and terephthalic acid from biomass renewal feedstocks rather than petroleum-based feedstocks. U.S. Pat. Appl. No. 2009/0246430 discloses PET in which the raw materials were bio-ethylene glycol prepared, for example, from sugar cane and bio-terephthalic acid prepared, for example from terpenes. Another approach is the development of polyesters based on furan dicarboxylic acid prepared from biomass such as sugars (U.S. Pat. Appl. No. 2011/0282020).

It has been disclosed (U.S. Pat. Appl. No. 2014/0205786) that in the homologous polyalkylene furanoate series using ethylene (PEF), 1,4-butylene (PBF) and 1,3-propane (PTF) diols, that the gas barrier properties are superior to polyalkylene terephthalates. In U.S. Pat. Appl. No. 2014/0205786 films were made with a blend of 10 wt. % PTF with 90 wt. % PET. The oxygen permeability of PET film, PTF film and 10 wt % PTF and 90 wt. % PET film was 20.1, 138.1 and 112.4 cc·mil/m²·day·atm respectively. The blend permeability is only decreased by 18% in this 10% blend, in spite of the fact that the oxygen permeability of PFT is about 680% lower than PET. No haze values were reported for these films.

There is a need for both a polyester resin and a process in which polyalkylene furanoates can be blended with PET, which provides lower gas permeability (higher gas barrier) in an article with good transparency.

SUMMARY OF THE INVENTION

In the broadest sense, the present invention comprises:
a uniform mixture of about 75 mole % to about 95 mole % sulfo-modified copolyester, and
from about 5 to about 25 mole % polyalkylene furanoate, wherein the composition is 100 mole %.

In the broadest sense, said sulfo-modified copolyester comprises at least about 75 mole % of polyethylene terephthalate or polyethylene naphthalate or a mixture thereof; and at least about 0.1 mole % to about 5 mole % of units of the Formula (I)

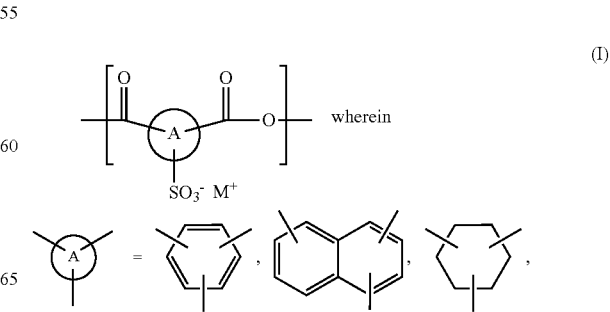

-continued

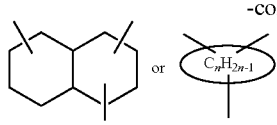

wherein n is an integer from 3 to 10 and
wherein $M^+$ is an alkali metal ion, earth alkali metal ion, phosphonium ion or ammonium ion.

In the broadest sense, the present invention comprises:
a uniform mixture of about 75 mole % to about 95 mole % sulfo-modified copolyester, and from about 5 to about 25 mole % polyalkylene furanoate,
wherein the composition is 100 mole %, said sulfo-modified copolyester comprises at least about 75 mole % of polyethylene terephthalate or polyethylene naphthalate or a mixture thereof; and
at least about 0.1 mole % to about 5 mole % of units of the Formula (I)

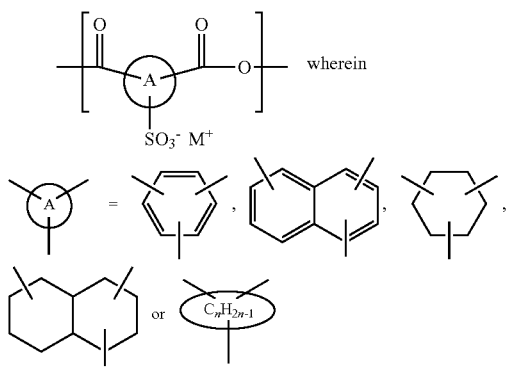

wherein n is an integer from 3 to 10 and
wherein $M^+$ is an alkali metal ion, earth alkali metal ion, phosphonium ion or ammonium ion.

Also in the broadest sense, the present invention is directed to a method of manufacturing an article comprising sulfo-modified copolyester and polyalkylene furanoate composition comprising the steps of:
a. dry blending sulfo-modified copolyester and polyalkylene furanoate, and
b. melting the said blend in an extruder, and
c. molding an article, and optionally
d. stretching said article,
wherein said composition comprises:
a uniform mixture of about 75 mole % to about 95 mole % sulfo-modified copolyester, and from about 5 to about 25 mole % polyalkylene furanoate,
wherein the composition is 100 mole %.

DETAILED DESCRIPTION

Composition of this invention comprise: a sulfo-modified copolyester and polyalkylene furanoates.

The sulfo-modified copolyester comprises at least about 75 mole %, and preferably 80 mole %, and not more than about 95 mole % of polyethylene terephthalate or polyethylene naphthalate, or mixtures thereof, and
at least 0.1 mole % but not more than 5.0 mole % of units of the Formula (I)

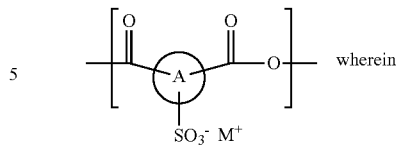

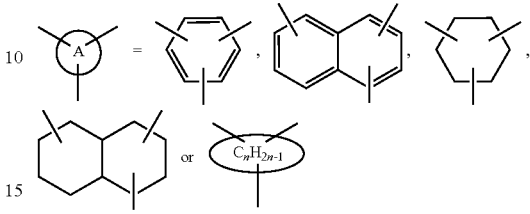

wherein n is an integer from 3 to 10 and
wherein $M^+$ is an alkali metal ion, earth alkali metal ion, phosphonium ion or ammonium ion and wherein the intrinsic viscosity is 0.6 to 1.0, preferably 0.7 to 0.9 and especially preferred 0.75 to 0.89 dl/g.

Preferably and especially preferred is with the attachments preferably in the 1-, 3- and 5-position (for the phenyl ring) and in 2-,4- and 6-position (for the naphthyl ring), most preferred is 5-sulfoisophthaloyl (prepared from 5-sulfoisophthalic acid).

Preferably $M^+$ is an alkali metal ion, especially preferred $Li^+$, $Na^+$ or $K^+$.

The preferred range of a 5-sulfoisophthalic acid monomer is about 0.5 to about 5.0 mole %, and more preferably 0.5 to 3.0 mole %. The remaining molar amount consists of diethylene glycol (DEG) formed during the polymerization, additional DEG, and other comonomers and other additives.

Other comonomers can be other dicarboxylic acids such as isophthalic acid, or the ester equivalents, or other diols such as cyclohexanedimethanol, all of which are well known to those skilled in the art.

Conventional known additives include, but are not limited to an additive of a dye, pigment, filler, branching agent, reheat agent, anti-blocking agent, antioxidant, anti-static agent, biocide, blowing agent, coupling agent, flame retardant, heat stabilizer, impact modifier, UV and visible light stabilizer, crystallization aid, lubricant, plasticizer, processing aid, acetaldehyde and other scavengers, and slip agent, or a mixture thereof. The mole percentage for all components totals 100 mole % of the copolyester.

It is preferred that the diacid component be TA (in this case the process is called PTA process or PTA route), or the dialkyl terephthalate component be dimethyl terephthalate (DMT) (in this case the process is called DMT process or DMT route), and R in the compound according to Formula (II) is hydrogen, methyl or hydroxyethylene.

Preferred production of the sulfo-modified copolyester according to the invention comprises reacting terephthalic acid (TA) (or dimethyl terephthalate—DMT), and the diacid or diester of Formula (I) with ethylene glycol (EG) at a temperature of approximately 200 to 290° C. forming monomer and water (100 to 230° C. forming monomer and methanol, when using DMT process). Because the reaction is reversible, the water (or methanol) is continuously removed, thereby driving the reaction to the production of monomer. The monomer comprises primarily the bishydroxyethyl ester of the employed acids/methyl esters, some monohydroxyethyl ester, and other oligomeric products and perhaps small amounts of unreacted raw materials. During the reaction of TA, Formula (I) diacid, and EG it is not necessary to have a catalyst present. During the reaction of DMT, Formula (I) diester and EG it is recommended to use an ester interchange catalyst. Suitable ester interchange catalysts are compounds of Groups Ia (e.g. Li, Na, K), IIa (e.g. Mg, Ca), IIb (e.g. Zn), IVb (e.g. Ge), VIIa (e.g. Mn) and VIII (e.g. Co) of the Periodic Table, e.g. the salts of these with organic acids. Preference is given to those ester interchange catalysts which exhibit some solubility in the reaction mixture. Preferred are salts of: Mn, Zn, Ca, or Mg, in particular manganese, with lower-aliphatic carboxylic acids, in particular with acetic acid.

The amount of Mn, Zn, Mg or other transesterification catalysts employed in the present invention is preferably from about 15 to about 150 ppm metal based on the polymer. Suitable cobalt compounds for use with the present invention include cobalt acetate, cobalt carbonate, cobalt octoate and cobalt stearate. The amount of Co employed in the present invention is from about 10 to about 120 ppm Co based on the polymer. This amount is sufficient to balance any yellowness that may be present in the polymer.

Subsequently, the bishydroxyethyl ester and monohydroxyethyl ester undergo a polycondensation reaction to form the polymer. Suitable catalysts for the polycondensation are compounds of antimony (e.g. antimony triacetate, antimony trioxide), germanium (e.g. germanium dioxide) and Ti (e.g. organic titanates, sodium titanate). Preferred polycondensation catalysts are the antimony compounds.

The polymer can subsequently be solid state polymerized by standard methods to increase its molecular weight (intrinsic viscosity) to that required to form the article. In solid state polymerization (SSP) processes pellets, granules, chips or flakes of polymer are subjected for a certain amount of time to elevated temperatures (below melting point) in a hopper, a tumbling drier or a vertical tube reactor or the like.

Alternative sulfo-modified copolyesters of this invention can be prepared in a similar manner by replacing the terephthaloyl moiety with a naphthaloyl moiety, and/or including an isophthaloyl moiety.

The polyalkylene furanoate can be prepared from a $C_2$ to $C_4$ aliphatic diol and from 2,5-furan dicarboxylic acid or an ester at the location of one or both of the acid moieties. The polyalkylene furanoate can be made by a two-step melt phase process, similar to that described for the sulfo-modified copolyester described above, followed by a solid state polymerization process.

The blend of the sulfo-modified copolyester and polyalkylene furanoate is conveniently prepared by adding the two resins at the throat of the injection molding machine that produces a preform that can be stretch blow molded into the shape of the container. The mixing section of the extruder should be of a design to produce a homogeneous blend.

Alternatively the blend can be prepared by using master batches. A master batch containing high amounts of the sulphonic acid of Formula (I) can be prepared. This master batch can be let down to the desired level during blending with a standard polyethylene terephthalate polymer (PET) and the polyalkylene furanoate. During the melting and mixing of the master batch with the standard polyethylene terephthalate polymer, the sulfo-modified copolyester is formed in situ by transesterification.

The extrusion temperature of the amorphous article, which is subsequently stretched into the final article, e.g. a stretch blown container, a blow molded bottle or a biaxially oriented film, should be set at a temperature below which the amorphous article becomes hazy due to thermal crystallization on cooling. This temperature can simply be established by increasing the extrusion temperature until haze is observed in the extruded article.

These process steps work well for forming carbonated soft drink, water or beer bottles, and containers for hot fill applications, for example. The present invention can be employed in any of the conventional known processes for producing a polyester article such as a container, bottle or film.

TESTING PROCEDURES

1. Gas Permeability

Oxygen permeability of bottle sidewalls was measured with a Mocon Ox-Tran 2/21 instrument (MOCON Minneapolis, MN) at 25° C. and 50% relative humidity according to ASTM method D3985-05. The permeability values (P) are reported in units of $(cc(STP) \cdot cm)/(m^2 \cdot atm \cdot day)$.

Alternatively they can be reported as a Barrier Improvement Factor (BIF) defined as:

$$BIF = P_{PET}/P_{Blend}$$

where $P_{PET}$ is the permeability of the PET control and $P_{Blend}$ is the permeability of the blend.

2. Intrinsic Viscosity (IV)

Intrinsic viscosity (IV) is determined using ASTM method D4603-96.

3. Haze

The haze of the preform and bottle walls was measured with a Hunter Lab ColorQuest II instrument. D65 illuminant was used with a CIE 1964 10° standard observer. The haze is defined as the percent of the CIE Y diffuse transmittance to the CIE Y total transmission.

4. Isophthalic and 5-sulfoisophthalic Acid

The percent isophthalic acid present in the amorphous polymer was determined, at 285 nanometers, using a Hewlett Packard Liquid Chromatograph (HPLC) with an ultraviolet detector. An amorphous polymer sample was hydrolyzed in diluted sulfuric acid (10 ml acid in 1 liter deionized water) in a stainless steel bomb at 230° C. for 3 hours. After cooling, an aqueous solution from the bomb was mixed with three volumes of methanol (HPLC grade) and an internal standard solution. The mixed solution was introduced into the HPLC for analysis.

The percent 5-sulfoisophthalic acid present in the amorphous polymer was determined by a sulfur analysis.

5. Metal Content

The metal content of the ground polymer samples was measured with an Atom Scan 16 ICP Emission Spectrograph. The sample was dissolved by heating in ethanolamine, and on cooling, distilled water was added to crystallize out the terephthalic acid. The solution was centrifuged, and the supernatant liquid analyzed. Comparison of atomic emissions from the samples under analysis with those of solutions of known metal ion concentrations was used to determine the experimental values of metals retained in the polymer samples.

6. Preform and bottle process

The copolyester resin of the present invention is typically, dried for 4-6 hours at 170-180° C., blended with the dried polyalkylene furanoate, melted and injection molded into 24.5 g preforms, using an Arburg single cavity injection molding machine. The stretch ratio of this preform is 14±1. The preform is then heated to about 100-120° C. and blow-molded into a 0.50 liter bottle using a Sidel SB01 stretch blow molding machine with a low-blow pressure of approximately 12 bar. The bottle sidewalls had an average thickness of 0.24 mm.

7. Materials

As used in the Example below, PET 1101 is a polyethylene terephthalate having an IV of 0.82 dl/g and containing 1.9 mole % isophthalic acid, PET 2312 is a sulfo-modified copolyester containing 1.2 mole % of sodium salt of 5-sulfoisophthalic acid and having an IV of 0.82 dl/g and both were obtained from Auriga Polymers (Spartanburg, South Carolina USA). Polytrimethylene furanoate having an IV of 1.14 dl/g was obtained from DuPont Company (Wilmington, Delaware USA).

EXAMPLE

Blends of PET 1101, PET 2312 containing 10 and 20 weight % of PTF were injection stretch blow molded into 0.5 liter bottles, at two injection temperatures. The oxygen permeability and haze of the bottle sidewalls were measured and the results set forth in Table 1.

TABLE 1

| Example | PET 1101, wt. % | PET 2312, wt. % | PTF, wt. % | Injection Temp., ° C. | % haze | $O_2$ BIF |
|---|---|---|---|---|---|---|
| 1 | 100 | — | — | 280 | 1.4 | 1.00 |
| 2 | 90 | — | 10 | 280 | 12.0 | 1.30 |
| 3 | 45 | 45 | 10 | 280 | 4.3 | 1.32 |
| 4 | 100 | — | — | 290 | 1.6 | 1.00 |
| 5 | 90 | — | 10 | 290 | 4.3 | 1.23 |
| 6 | 45 | 45 | 10 | 290 | 2.2 | 1.25 |
| 7 | 80 | — | 20 | 280 | 5.2 | 1.47 |
| 8 | 40 | 40 | 20 | 280 | 4.4 | 1.52 |

The results of Examples 3 and 6, show that the addition of the sulfo-modified polyester to the blend of PET and 10 wt. % PTF significantly reduced the bottle haze and improved the oxygen gas barrier of the bottles at both injection temperatures. However a higher BIF was obtained at an injection temperature of 280° C., but a lower haze was observed at the higher injection temperature of 290° C. It is believed that at the higher injection temperature there is more transesterification between the PTF and the copolyesters resulting in an improvement in haze but a decrease in BIF. The results of Example 8 show that the addition of the sulfo-modified polyester to the blend of PET and 20 wt. % PTF significantly reduced the bottle haze and improved the oxygen gas barrier of the bottles at the 280° C. injection temperature.

What is claimed is:

1. A molded bottle formed from a polyester composition comprising a blend of the following:
   (a) about 40-45 wt. % of a polyethylene terephthalate comprising an isophthalic acid comonomer;
   (b) about 40-45 wt. % of a sulfo-modified copolyester having an intrinsic viscosity (IV) of about 0.6 to 1.0 dL/g according to ASTM D4603-96, wherein the sulfo-modified copolyester comprises at least about 1 mole % to about 5 mole % of units of Formula (I)

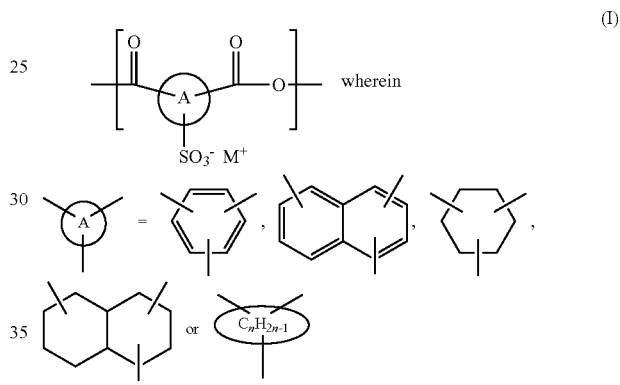

wherein n is an integer from 3 to 10 and
   wherein $M^+$ is an alkali metal ion, earth alkali metal ion, phosphonium ion or ammonium ion; and
   (c) about 10-20 wt. % of a polyalkylene furanoate selected from polyethylene furanoate, polybutylene furanoate, polytrimethylene furanoate, or any mixtures thereof, wherein
   (a), (b), and (c) total 100 wt. %, and wherein
   the molded bottle exhibits the following properties:
   a haze of less than 5%, and
   a Barrier Improvement Factor (BIF), defined as the ratio of oxygen permeability of a PET control bottle including only component (a) divided by the oxygen permeability of the molded bottle formed from the polyester composition, of at least 1.25, wherein oxygen permeability is measured according to ASTM D3985-05 (25° C., 50% RH).

2. The molded bottle of claim 1, wherein the sulfo-modified copolyester comprises a metal salt of 5-sulfoisophthalic acid.

3. The molded bottle of claim 1, wherein the sulfo-modified copolyester has an intrinsic viscosity of 0.7 to 0.9 dL/g.

4. The molded bottle of claim 1, wherein the molded bottle has a haze of <5% and a BIF of >1.3.

5. The molded bottle of claim 1, wherein the molded bottle has a haze of <5% and a BIF of >1.5.

6. The molded bottle of claim 1, wherein the molded bottle has a haze of less than 3% and a BIF >1.25.

7. The molded bottle of claim 2, wherein the metal salt is sodium, potassium or lithium.

\* \* \* \* \*